(12) United States Patent
Rouaud et al.

(10) Patent No.: US 8,215,427 B2
(45) Date of Patent: Jul. 10, 2012

(54) METHOD FOR CONTROLLING A VEHICLE DRIVE TRAIN COMPRISING TWO COOLING CIRCUITS

(75) Inventors: Cedric Rouaud, Versailles (FR); Robert Yu, Montigny (FR)

(73) Assignee: Renault S.A.S., Boulogne Billancourt (FR)

( * ) Notice: Subject to any disclaimer, the term of this patent is extended or adjusted under 35 U.S.C. 154(b) by 1062 days.

(21) Appl. No.: 12/066,763

(22) PCT Filed: Sep. 7, 2006

(86) PCT No.: PCT/FR2006/050857
§ 371 (c)(1),
(2), (4) Date: Jun. 13, 2007

(87) PCT Pub. No.: WO2007/031670
PCT Pub. Date: Mar. 22, 2007

(65) Prior Publication Data
US 2008/0251303 A1 Oct. 16, 2008

(30) Foreign Application Priority Data
Sep. 13, 2005 (FR) ...................................... 05 09331

(51) Int. Cl.
*B60W 10/30* (2006.01)
(52) U.S. Cl. ...................................... 180/65.27; 701/22
(58) Field of Classification Search ............... 180/65.27, 180/65.265, 65.275, 65.25; 123/41.31; 475/5; 477/5–10; 701/22
See application file for complete search history.

(56) References Cited

U.S. PATENT DOCUMENTS

| | | | |
|---|---|---|---|
| 5,255,733 A * | 10/1993 | King | 165/299 |
| 5,531,285 A * | 7/1996 | Green | 180/65.25 |
| 6,148,910 A * | 11/2000 | Warner | 165/297 |
| 6,149,544 A * | 11/2000 | Masberg et al. | 477/13 |
| 6,213,233 B1 * | 4/2001 | Sonntag et al. | 180/65.245 |
| 6,450,275 B1 | 9/2002 | Gabriel et al. | |
| 6,467,286 B2 * | 10/2002 | Hasebe et al. | 62/185 |
| 6,491,001 B1 * | 12/2002 | Dean et al. | 123/41.31 |
| 6,616,059 B2 * | 9/2003 | Sabhapathy et al. | 237/12.3 B |
| 6,810,977 B2 * | 11/2004 | Suzuki | 180/65.25 |
| 7,147,071 B2 * | 12/2006 | Gering et al. | 237/12.3 B |
| 7,168,398 B2 * | 1/2007 | Ap et al. | 123/41.1 |
| 7,290,629 B2 * | 11/2007 | Ozeki et al. | 180/65.23 |
| 7,634,978 B2 * | 12/2009 | Boudard et al. | 123/41.31 |
| 7,650,753 B2 * | 1/2010 | Muller et al. | 60/599 |
| 2002/0053216 A1 * | 5/2002 | Ap et al. | 62/323.1 |
| 2004/0045749 A1 * | 3/2004 | Jaura et al. | 180/65.2 |
| 2004/0163861 A1 * | 8/2004 | Fukuda et al. | 180/65.2 |
| 2007/0137909 A1 * | 6/2007 | Zillmer et al. | 180/65.2 |
| 2008/0251303 A1 * | 10/2008 | Rouaud et al. | 180/65.2 |
| 2010/0070123 A1 * | 3/2010 | Itoh et al. | 701/22 |
| 2010/0121513 A1 * | 5/2010 | Itoh et al. | 701/22 |
| 2010/0243215 A1 * | 9/2010 | Cimatti et al. | 165/104.31 |
| 2011/0083916 A1 * | 4/2011 | Cimatti et al. | 180/65.22 |

FOREIGN PATENT DOCUMENTS

| | | |
|---|---|---|
| EP | 1 059 426 | 12/2000 |
| GB | 2 341 830 | 3/2000 |
| JP | 11 313406 | 11/1999 |
| JP | 2004-076603 | * 3/2004 |

* cited by examiner

*Primary Examiner* — J. Allen Shriver, II
*Assistant Examiner* — Emma K Frick
(74) *Attorney, Agent, or Firm* — Oblon, Spivak, McClelland, Maier & Neustadt, L.L.P.

(57) ABSTRACT

A method for controlling a vehicle drive train, which communicates or maintains in communication via at least one valve two cooling circuits operating normally and respectively associated with a heat engine and with at least one electrical member.

15 Claims, 5 Drawing Sheets

Mode 6 - Running in hybrid mode, liquid hot or very hot

Mode 7 - Running in electric mode maintaining the level of comfort in the cabin and also, when the engine (and the vehicle) is at a standstill, cooling the engine and the turbocompressor bearings

METHOD FOR CONTROLLING A VEHICLE DRIVE TRAIN COMPRISING TWO COOLING CIRCUITS

BACKGROUND

The invention relates to the control of motor vehicle power trains and in particular to the control of their cooling circuits.

It is known that hybrid vehicles are equipped with a power train comprising a combustion engine, one or two electrical machines, power electronic components and a power battery.

The combustion engine can be used to recharge the batteries via a generator and/or to provide the vehicle with traction or propulsion. When the combustion engine simply recharges the vehicle batteries, it is said to be a series hybrid vehicle. When the combustion engine provides the vehicle with traction and/or propulsion, it is then said to be a parallel hybrid vehicle.

Whatever the architecture connecting the combustion engine and the electrical machine or machines, it is necessary to cool the combustion engine, the electrical machine or machines, and the power electronic components.

However, the temperature level required for the liquid used to cool the electrotechnical components (the electrical machine or machines and the power electronic components) and the temperature level required for the liquid used to cool the combustion engine are not the same. Indeed, to improve the reliability of the electrotechnical components (particularly the power electronics), the temperature of the liquid coolant must not exceed a threshold value such as 70° C. Also conventionally, the liquid used to cool the combustion engine must not itself exceed a threshold temperature such as 100° C.

It is therefore advantageous to use two cooling circuits so as to satisfy the thermal specifications of the components of the hybrid power train, namely a low-temperature circuit for the electrotechnical components and a high-temperature circuit for the engine.

The use of two cooling circuits that are entirely separate or are in contact via a degassing vessel means that an additional electric water pump has to be run constantly thus increasing the electrical power consumption of the vehicle, the required life of the electric pump, and its cost. In some instances, it also dictates the use of two degassing vessels.

It will also be recalled that, in the case of engines equipped with a turbocompressor, it has become common practice to use an electric water pump to cool the bearings of the turbocompressor when the engine is not running. It is also necessary to use an electric water pump on a hybrid vehicle in order to maintain comfort levels within the cabin when the engine is not running when the vehicle is stationary or when driving under electrical power.

Document JP-2004 07 66 03 discloses a vehicle in which the two cooling circuits associated respectively with the engine and with the electric motor can be placed in fluidic communication if the pump belonging to one of the circuits should fail. The establishing of communication is restricted to this abnormal circumstance.

BRIEF SUMMARY

It is an object of the invention to improve the operation of power trains, particularly, although not exclusively, in the case of hybrid vehicles, so as to improve the cooling of the engine in engine mode and also improve the rise in temperature of the combustion engine and the cabin heating.

To do this, the invention provides a method for controlling a power train of a vehicle, in which two cooling circuits that operate in the normal way, one of them associated with a combustion engine and the other with at least one electric member, are placed or kept in communication by means of at least one valve.

Normal operation is to be understood to mean operation with no failure of any of the components of each circuit.

The method according to the invention may also exhibit at least any one of the following features:
- the electric member or one of the electric members comprises a motor;
- the communication is established or maintained when the vehicle is being propelled by the electric motor alone, for example during a cold start or when cabin heating is required, or when cooling of the combustion engine and/or of a turbocompressor is required;
- communication is established or maintained when the vehicle is being propelled by means of the combustion engine and the electric motor simultaneously, for example during a cold start;
- communication is established or maintained when the vehicle is being propelled by the combustion engine alone, for example when a temperature of a liquid in the circuit associated with the combustion engine crosses a predetermined threshold;
- communication is then interrupted;
- the interruption is established or maintained when the vehicle is being propelled by the combustion engine alone, for example during a cold start or a hot start or when running hot; and
- the interruption is established or maintained when the vehicle is being propelled by the combustion engine and the electric motor simultaneously, for example when a liquid in the circuit associated with the combustion engine crosses a second predetermined threshold.

The invention also provides a vehicle comprising:
- control means;
- two cooling circuits, respectively associated with a combustion engine and with at least one electric member; and
- at least one valve for placing the circuits in communication with each other, the control means being designed to control the establishment or maintenance of communication between circuits which operate in the normal way.

The vehicle according to the invention may also exhibit at least any one of the following features;
- the number of valves is less than or equal to two; and
- the valve or at least one of the valves is a three-position valve.

BRIEF DESCRIPTION OF THE DRAWINGS

Other features and advantages of the invention will become further apparent from the following description of a preferred embodiment and of an alternative form of embodiment which are given by way of nonlimiting examples with reference to the attached drawings in which.

DETAILED DESCRIPTION

Figure 1:
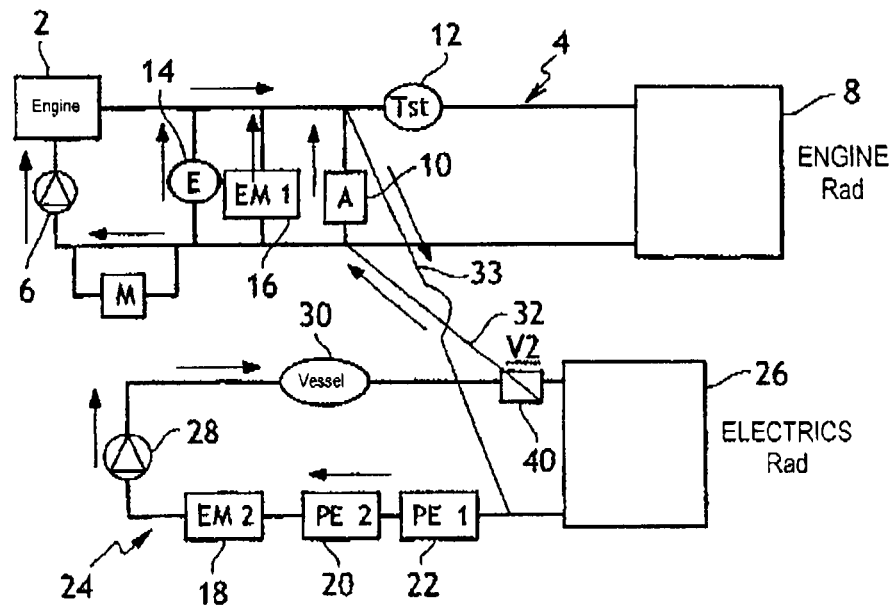
FIG. 1 is a schematic view of the cooling circuits in a vehicle according to a preferred embodiment of the invention.

A preferred embodiment of a vehicle according to the invention is illustrated in FIG. 1. This figure shows that the vehicle comprises a combustion engine 2 associated with a cooling circuit 4. This circuit comprises a water pump 6 which is either mechanical and driven off the combustion engine, or electric. The circuit 4 contains a cooling radiator 8 known as the high-temperature radiator or engine radiator. The circuit 4 also comprises a unit heater 10 or cabin heating radiator. This same circuit in this instance comprises a thermostat 12 in the form of a wax thermostat, a controlled thermostat or alternatively a controlled valve allowing the temperature of the liquid coolant flowing through the circuit 4 to be regulated. The circuit may comprise other conventional components according to the technical design of the engine and according to whether it is a controlled-ignition or compression-ignition engine. These components might, for example, be:

a liquid coolant/engine oil heat exchanger;
 a liquid coolant/gearbox oil heat exchanger; or
 a liquid coolant/EGR heat exchanger 14,
 the turbocompressor bearings,
 the motorized throttle valve housing.

The circuit comprises a circuit filling and degassing vessel, not illustrated. It also possibly comprises one of the two electric machines 16, for example the generator.

The power train comprises, in addition to the electric machine 16, a second electric machine 18 such as a motor together with power electronic components 20 and 22. A cooling circuit 24 separate from the circuit 4 is associated with these elements. This is a circuit known as a low-temperature circuit which comprises:

a cooling radiator 26 known as the low-temperature radiator or electrics radiator;
 an electric water pump 28; and
 optionally, a degassing vessel 30.

In the high-temperature circuit 4, the unit heater 10, the electrical machine 16, the heat exchanger 14 and the radiator 8 are positioned in parallel with the branch bearing the combustion engine 2 and the pump 6.

In the low-temperature circuit 24, all the components introduced are arranged in series in a single loop.

These two circuits are known as cooling circuits but it would be more accurate to call them cooling or heating circuits because it will be seen that they can also be used to heat up certain components.

According to the invention, the two circuits 4 and 24 are in fluidic communication. In this particular instance, a first communication duct 32 connects a point situated on the low-temperature circuit 24 between the vessel 30 and the radiator 26 to the end of the branch carrying the unit heater 10 in the high-temperature circuit 4. This is an outbound duct allowing liquid to pass from the circuit 24 to the circuit 4. A return duct 33 is provided in parallel, at the other end of the branch bearing the unit heater in the circuit 4 and carrying the liquid to a point situated between the radiator 26 and the power component 22.

Furthermore, a three-way valve V2 40 is positioned in the circuit 24 at the intersection between the outbound duct 32 and this circuit.

Figure 2:
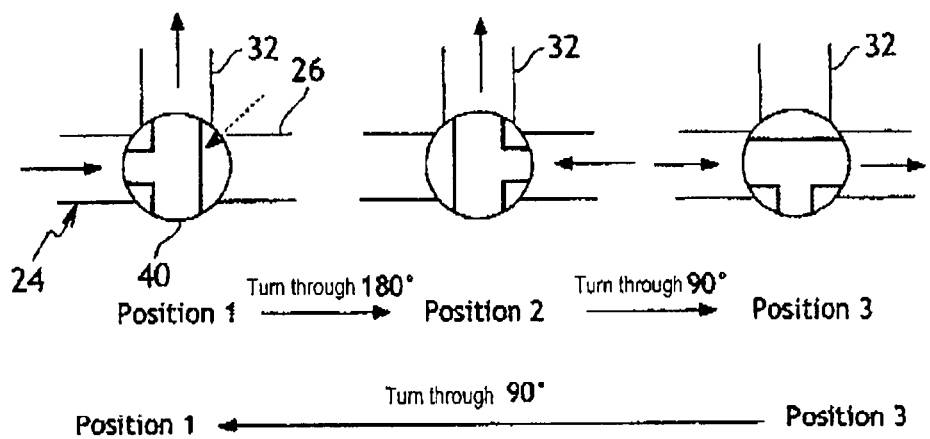
FIG. 2 shows the various positions of the valve that forms part of the circuit of FIG. 1.

The three positions that the moving part of this valve can occupy have been illustrated in detail in FIG. 2. Thus, to switch from position 1 to position 2 this element has to be turned through 180°. To switch from position 2 to position 3, it needs to be turned through just 90° in the same direction, and turning it through a further 90° in the same direction will return this element to position 1.

In position 1, communication towards the radiator 26 is cut off. In position 2, it is the communication from the vessel which is cut off. In position 3, it is the communication with the duct 32 that is disallowed. Communication between the other two ducts is permitted in each instance.

The liquid coolant used in these two circuits in this instance is a mixture of water and ethylene glycol or any other liquid of which the thermophysical properties are similar to those of this mixture.

Naturally, components other than those introduced can be incorporated into the low-temperature and high-temperature circuits.

In this example, the combustion engine is a compression-ignition engine requiring the use of a liquid coolant/EGR gas exchanger 14. However, this is merely one example.

Various engine operating circumstances and the corresponding configurations of the circuits as controlled by the onboard computer of the vehicle according to the method of the invention will now be described.

The various operating modes will be defined as follows:
 electric mode: the vehicle is provided with propulsion and/or traction by the electric motor 18 without the intervention of the combustion engine;
 engine mode: the vehicle is provided with propulsion and/or traction by the combustion engine alone, and therefore without the intervention of the electric motor; and
 hybrid mode: the vehicle is provided with propulsion and/or traction by the combustion engine and the electric motor simultaneously.

Mode 1—Running in Electric Mode During a Cold Start

This operating circumstance corresponds to FIG. 1. When running an electric mode, of the two pumps only the electric water pump 28 of the low-temperature circuit 24 is running because the combustion engine 2 and its pump 6 are switched off. In this case, the valve 40 is controlled in such a way that it closes access to the low-temperature radiator 26. The liquid therefore flows in the direction of the arrows shown in FIG. 1. In other words, the liquid runs, in this order, through components 22, 20, 18, 28, 30 then through the valve 40 to enter the duct 32. It then runs through the various branches of the circuit 4 with the exception of the radiator 8 and returns to the circuit 24 via the duct 33. Thus, during a cold start of the vehicle in electric mode, the power dissipated by the electrotechnical components improves the increase in temperature of the combustion engine and can be used to dissipate heat energy in the unit heater if cabin heating has been called for.

Mode 2—Running in Hybrid Mode During a Cold Start

Figure 3:
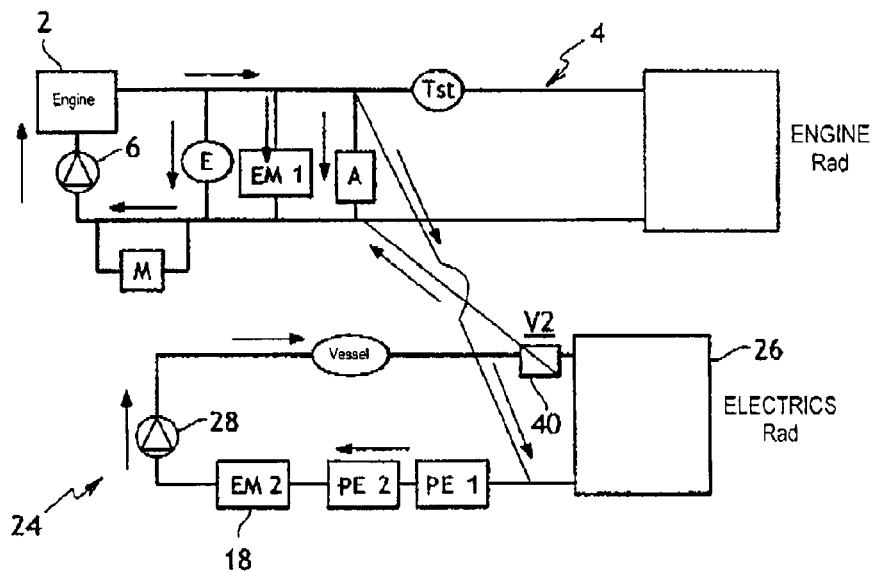
FIGS. 3 to 8 show the circuits of FIG. 1 in other operating circumstances.

This mode corresponds to that of FIG. 3. When running in hybrid mode, both the mechanical pump 6 and the electric pump 28 are in operation. Communication between the high-temperature and low-temperature circuits is established and/or maintained because once again it allows the power dissipated by the electrotechnical components to be used to improve the increase in temperature of the coolant and of the combustion engine. It also improves the increase in temperature of the cabin via the power dissipated in the unit heater if a demand for heating has been made. As before, the valve V2 shuts off access to the low-temperature radiator and, like in FIG. 1, is therefore in position 1.

Mode 3—Running in Engine Mode During a Cold Start

Figure 4:
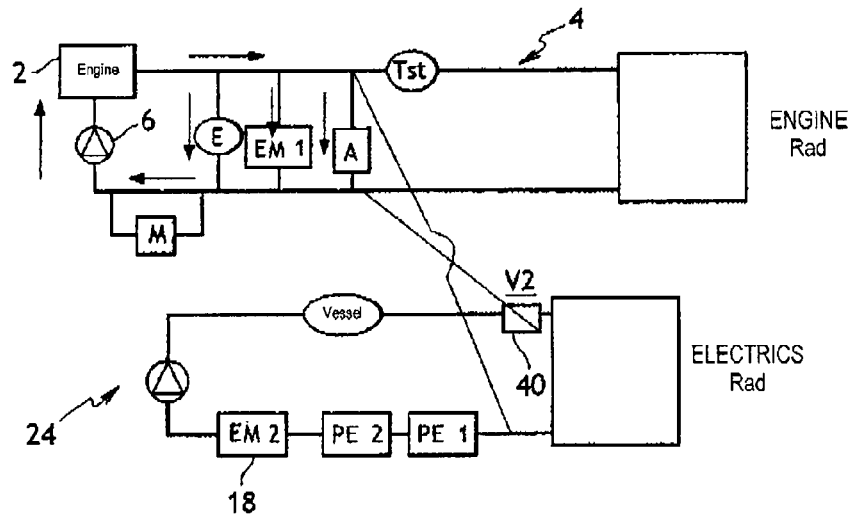

In this mode which is illustrated in FIG. 4, which is engine mode with cold start, of the two pumps, only the mechanical water pump 6 is in operation. The electrotechnical components 18, 20 and 22 are not running. The valve is therefore positioned or kept in position 3 so that it closes off access to the outbound duct 32. This being the case, fluidic communication between the two circuits is interrupted. The combustion engine heats up of its own accord like it would on a power train of a conventional vehicle, that is to say of a non-hybrid vehicle.

Mode 4—Running in Engine Mode with a Hot Liquid

Figure 5:
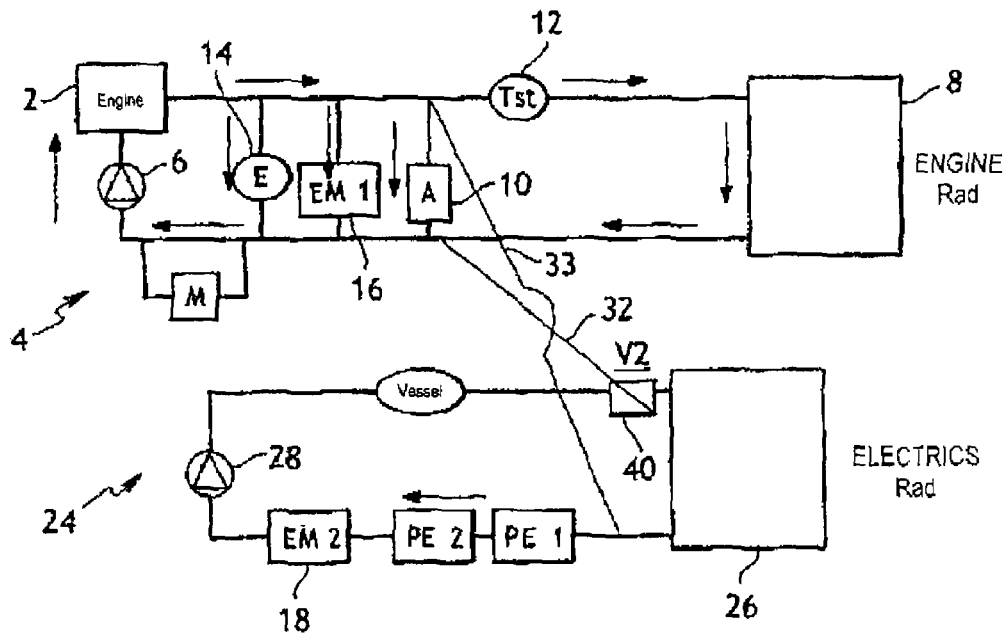

In this mode which is illustrated in FIG. 5, the thermostat 12 of the high-temperature circuit opens so that the coolant can be cooled in the engine radiator. In concrete terms, provision may be made for the thermostat to open at around 85 or 90° C. However, it is possible for the thermostat to be in a controlled configuration in which case its opening temperature may be higher. It will, for example, be fixed at 110° C. for light engine loads. This thermostat may also be replaced by a controlled valve. When it is, the valve 40 is positioned in such a way that the interruption in communication between the two circuits is established or maintained. Here too, the valve is again in position 3.

Mode 5—Running in Engine Mode, Liquid Very Hot

Figure 6:
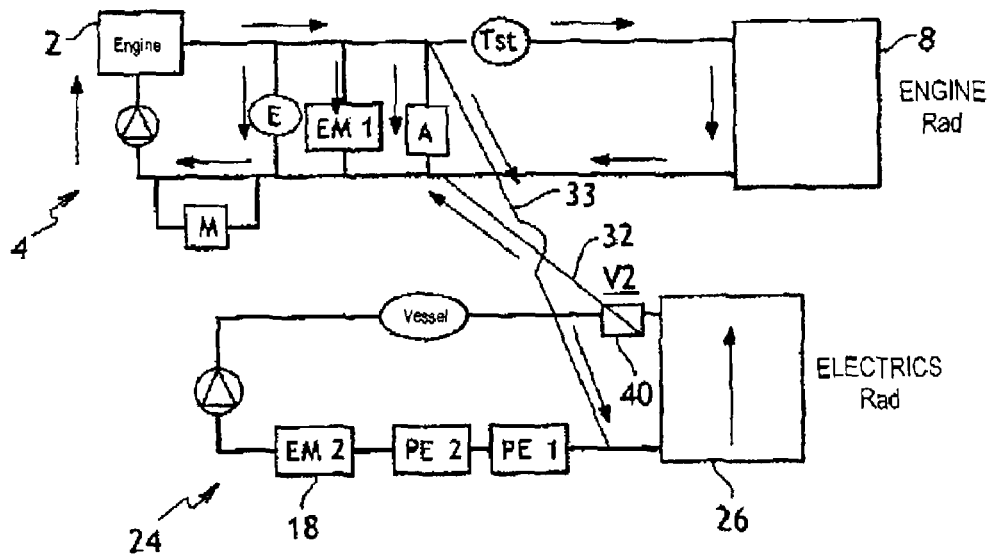

This mode which is illustrated in FIG. 6 corresponds for example to the case where the liquid in the high-temperature circuit is at approximately 100° C. Provision may for example be made for the temperature of the liquid to cross a threshold such as 90 or 95° C. Running in engine mode very hot is performed when vehicle propulsion or traction is provided by the combustion engine alone and the electrotechnical components are not operating. During this mode of operation the combustion engine dissipates a great deal of heat energy to the coolant, for example 60 kw. Given that the electro technical components are not operating, they do not need to be cooled. This is why it is contrived for the electrics radiator 26 to assist with cooling the combustion engine. To do that, the position of the valve is position 2 so that liquid arriving from the circuit 4 via the return duct 33 is conveyed in its entirety to the electrics radiator 26 then directed via the valve into the outbound duct 32. An operating circumstance such as this may be encountered in very high temperatures or when there is a particularly high load on the engine, particularly when traveling at high speed.

Mode 6—Running in Hybrid Mode with Hot or Very Hot Liquid

Figure 7:
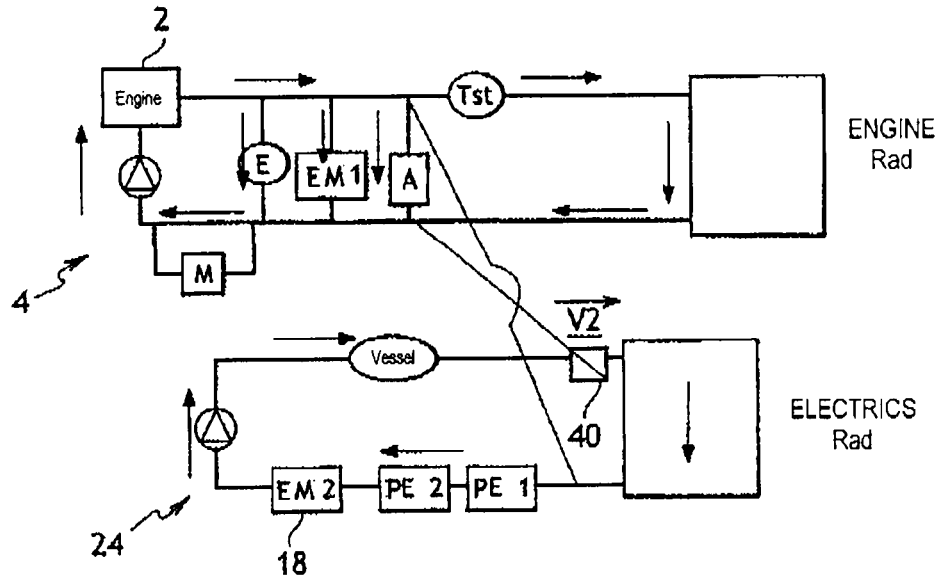

This mode corresponds to FIG. 7. When running in hybrid mode with the liquid hot or very hot, both the engine radiator and the electrics radiator need to be designed to be able to dissipate the power supplied by the combustion engine and by the electrotechnical components. The two cooling circuits are therefore completely separated by the valve 40 which is positioned in position 3 so as not to allow any fluidic communication between the circuits. Naturally, one or more suitable temperature thresholds will be defined in order to allow the control means to position the valve in this position when this temperature threshold is crossed by the liquid in the high-temperature circuit.

Figure 8:
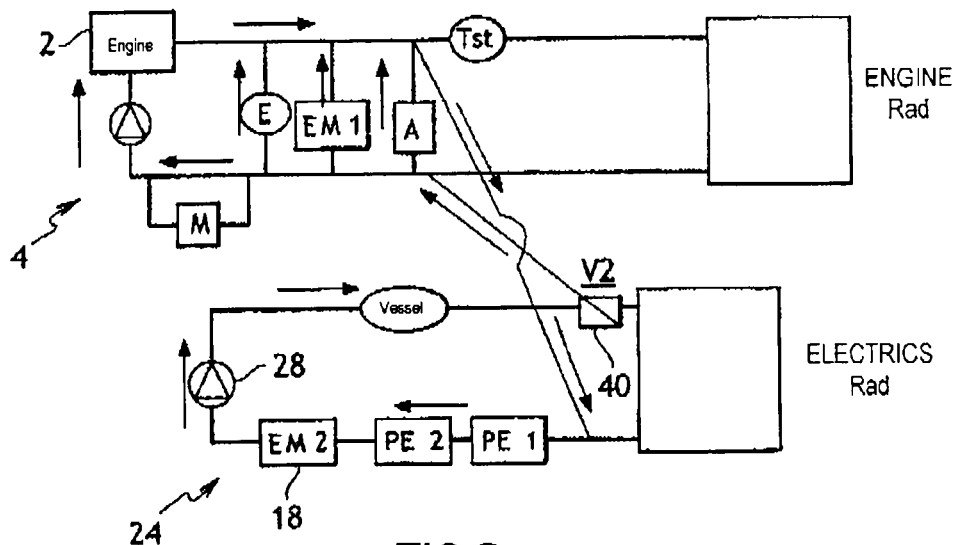

Mode 7—Running in Electric Mode Maintaining the Level of Comfort in the Cabin and, when the Engine is Switched Off, Cooling the Turbocompressor Bearings and the Vehicle This is the scenario in FIG. 8. When the vehicle is at a standstill after having been running, during which running a level of thermal comfort has been achieved within the cabin, placing the low-temperature and high-temperature circuits in communication with one another via the valve means that just one electric water pump such as the water pump 28 of the low-temperature circuit can be used to maintain the level of comfort in the cabin. The valve is therefore positioned in position 1.

What actually happens is that when the combustion engine is not running, and a predetermined level of comfort has been maintained within the cabin via the heat energy dissipated in the unit heater, the temperature within the cabin drops sharply because the power dissipated in the unit heater to be sent to the cabin uses only the energy stored within the volume of water contained in this unit heater. If a coolant flow rate is maintained through the cooling circuit using the electric water pump of the low-temperature circuit then the level of thermal comfort can be sustained for far longer.

In concrete terms, during a prolonged stoppage of the vehicle with the driver or passengers remaining inside the vehicle, this circulating of liquid caused by running the electric water pump allows the level of comfort in the cabin to be maintained for 30 minutes for example at an outside temperature of −20° C. Conversely, if the water were not circulated when the combustion engine and the vehicle were at a standstill, the level of comfort would be maintained for only about five minutes.

In addition, circulating water through the combustion engine after running limits the thermomechanical stresses within this engine. This is because circulating the coolant reduces the temperature of the engine without there being any localized boiling within the cylinder head or the engine block. It will be recalled that the energy amassed by the engine during running is very great. The term then employed is post-cooling. The same is true of the engine components such as the turbocompressor bearings which need to be post-cooled after running during which the engine was very heavily loaded.

Alternative Form

Figure 9:
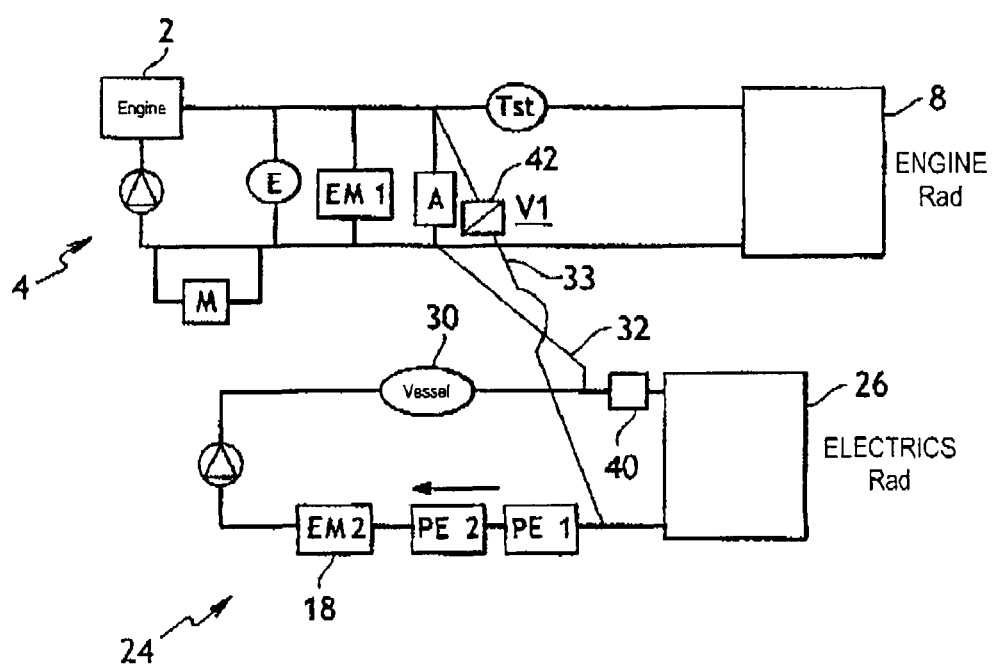
FIG. 9 is a diagram similar to that of FIG. 1 showing an alternative form of embodiment.

FIG. 9 illustrates an alternative form of embodiment of the invention. In this alternative form, the valve 40 is a two-way valve positioned between the upstream end of the outbound duct 32 and either the electrics radiator 26 or the vessel 30. In addition, an additional valve V1 42 positioned on the return duct 33 is provided. The latter valve is an open/closed valve. The configurations that have just been introduced in the various embodiments can be implemented in this alternative form using the two valves.

The invention offers numerous advantages. It assists with cooling the combustion engine during engine running at vehicle speeds in excess of a threshold speed such as 130 km/h for example.

It uses the power dissipated by the electrotechnical components to improve the increase in temperature of the combustion engine, of the cabin or of any other component that needs to reach a high operating temperature as quickly as possible. This may, for example, be an engine oil/coolant heat exchanger, a gearbox oil/coolant heat exchanger, an EGR gas/coolant heat exchanger or an engine charge air/coolant heat exchanger. This action makes it possible to reduce the emissions of pollutants (particularly of HC and of CO) and the consumption of fuel.

Thus it allows the heat energy dissipated by the electrotechnical components to be used to improve the increase in temperature of the combustion engine or of the cabin (via the unit heater) when running in electric mode and when the combustion engine has not been running for a long time, for example for six hours.

The invention makes it possible to reduce the running time and cost of the additional electric water pump devoted to cooling the electrotechnical components.

It eliminates the second degassing vessel devoted to the low-temperature circuit in the prior art.

It allows the use of just one additional electric water pump incorporated into the low-temperature circuit in order, when the combustion engine is switched off, to cool the sensitive components, to maintain a circulation of water through the combustion engine to post-cool it or even to maintain the level of thermal comfort in the cabin.

When the engine is switched off at traffic lights (driving of the "stop and start" type), circulating water through the unit heater and through the combustion engine allows the level of thermal comfort to be maintained.

Switching off the engine after a phase of relatively severe running (such as stopping at a toll booth and switching the engine off) causes the engine to overheat and may even damage the turbocompressor bearings and accelerate the aging of the lubricating oil. As a result, it is highly beneficial for the water to be able to be circulated by the electric pump when the engine is switched off.

On high-powered engines, cooling entails a relatively large radiator that is difficult to incorporate into the vehicle. As a result, it is advantageous to be able to use the electrotechnical component radiator to assist with cooling the combustion engine.

The electrical contacts of a pump just as with the other electric motors (starter motor, windshield wiper motor, etc.) are provided via brushes or carbon brushes. These components represent good value for money but their life is limited. A brushless technology is known that has a longer life but at twice the cost. It is therefore advantageous to run the pump as little as possible so that it draws less power but also to reduce its cost.

Thus, coupling the high-temperature circuit with the low-temperature circuit allows all the abovementioned requirements to be met.

Of course, numerous modifications may be made to the invention without departing from its scope.

The invention can be implemented with high-temperature and low-temperature cooling circuits that are coupled to one another for example on conventional vehicles, for applications such as cooling the boost air, the recirculated exhaust gases, and the water/oil heat exchangers for the engine or the gearbox. Indeed, coupling the two circuits together improves the increase in temperature of the engine and of the cabin.

The invention claimed is:

1. A method for controlling a power train of a vehicle, comprising:
    placing two cooling circuits that operate in a normal way, a first one of the cooling circuits associated with a combustion engine and a second one of the cooling circuits associated with at least one electric member, in fluidic communication by at least one valve in a first position;
    detecting a temperature of fluid circulating in the first one of the cooling circuits;
    adjusting, when the temperature in the first one of the cooling circuits rises above a first predetermined threshold, the at least one valve to a second position in which the fluid circulating in the second one of the cooling circuits does not circulate in the first one of the cooling circuits such that the fluid in the second one of the cooling circuits does not cool the combustion engine; and
    adjusting, when the temperature of the fluid in the first one of the cooling circuits rises above a second predetermined threshold that is hotter than the first predetermined threshold, the at least one valve to a third position in which the fluid arriving in the second one of the cooling circuits from the first one of the cooling circuits is conveyed through an electronics radiator in the second one of the cooling circuits before returning to the first one of the cooling circuits.

2. The method as claimed in claim 1, wherein the electric member or one of the electric members comprises an electric motor.

3. The method as claimed in claim 2, wherein the communication is established or maintained when the vehicle is being propelled by the electric motor alone.

4. The method as claimed in claim 3, the communication is established or maintained during a cold start.

5. The method as claimed in claim 3, wherein the communication is established or maintained when cabin heating is required.

6. The method as claimed in claim 3, wherein the communication is established or maintained when cooling of the combustion engine and/or of a turbocompressor is required.

7. The method as claimed in claim 2, wherein the communication is established or maintained when the vehicle is being propelled by the combustion engine and the electric member simultaneously.

8. The method as claimed in claim 7, wherein the communication is established or maintained during a cold start.

9. The method as claimed in claim 2, wherein the communication is established or maintained when the vehicle is being propelled by the combustion engine alone.

10. The method as claimed in claim 1, wherein the adjusting the at least one valve to the second position causes an interruption in the communication and is established when the vehicle is being propelled by the combustion engine alone.

11. The method as claimed in claim 10, wherein the interruption is established or maintained when the fluid in the first one of the cooling circuits is running hot.

12. The method as claimed in claim 1, wherein the adjusting the at least one valve to the second position causes an interruption in the communication and is established when the vehicle is being propelled by the combustion engine and the electric member simultaneously.

13. A vehicle, comprising:
    control means;
    two cooling circuits, including a first one of the cooling circuits that is associated with a combustion engine and a second one of the cooling circuits that is associated with at least one electric member; and
    at least one valve that places the two cooling circuits in communication with each other when the at least one valve is in a first position,
    wherein the control means controls establishment or maintenance of communication between the two cooling circuits that operate in a normal way,
    wherein, when a temperature in the first one of the cooling circuits rises above a predetermined threshold, the control means adjusts the at least one valve to a second position in which fluid circulating in the second one of the cooling circuits does not circulate in the first one of the cooling circuits such that the fluid in the second one of the cooling circuits does not cool the combustion engine, and
    wherein, when the temperature of the fluid in the first one of the cooling circuits rises above a second predetermined threshold that is hotter than the first predetermined threshold, the control means adjusts the at least one valve to a third position in which the fluid arriving in the second one of the cooling circuits from the first one of the cooling circuits is conveyed through an electronics radiator in the second one of the cooling circuits before returning to the first one of the cooling circuits.

14. The vehicle as claimed in claim 13, wherein the number of valves is less than or equal to two.

15. The vehicle as claimed in claim 13, wherein the at least one valve is a three-position valve.

* * * * *

UNITED STATES PATENT AND TRADEMARK OFFICE
CERTIFICATE OF CORRECTION

| | | |
|---|---|---|
| PATENT NO. | : 8,215,427 B2 | Page 1 of 1 |
| APPLICATION NO. | : 12/066763 | |
| DATED | : July 10, 2012 | |
| INVENTOR(S) | : Cedric Rouaud et al. | |

It is certified that error appears in the above-identified patent and that said Letters Patent is hereby corrected as shown below:

On the title page, Item (86), the Application Filing Date is incorrect. Item (86) should read:

-- (86)   PCT No.:        PCT/FR2006/050857

§ 371 (c)(1),
(2), (4) Date:   Jun. 13, 2008 --

Signed and Sealed this
Fourth Day of September, 2012

David J. Kappos
*Director of the United States Patent and Trademark Office*